US012560790B2

(12) United States Patent
Takanashi et al.

(10) Patent No.: US 12,560,790 B2
(45) Date of Patent: Feb. 24, 2026

(54) OPTICAL MEASUREMENT METHOD, OPTICAL MEASUREMENT APPARATUS, AND NON-TRANSITORY STORAGE MEDIUM STORING OPTICAL MEASUREMENT PROGRAM

(71) Applicant: KABUSHIKI KAISHA TOSHIBA, Tokyo (JP)

(72) Inventors: Kenta Takanashi, Kawasaki Kanagawa (JP); Hiroya Kano, Kawasaki Kanagawa (JP); Hiroshi Ohno, Tokyo (JP); Hideaki Okano, Yokohama Kanagawa (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 355 days.

(21) Appl. No.: 18/459,070

(22) Filed: Aug. 31, 2023

(65) Prior Publication Data

US 2024/0319486 A1      Sep. 26, 2024

(30) Foreign Application Priority Data

Mar. 22, 2023    (JP) ................................. 2023-045785

(51) Int. Cl.
*G02B 21/00* (2006.01)
*G02B 21/12* (2006.01)
*G02B 21/36* (2006.01)

(52) U.S. Cl.
CPC ..... *G02B 21/0032* (2013.01); *G02B 21/0036* (2013.01); *G02B 21/125* (2013.01); *G02B 21/361* (2013.01); *G02B 21/365* (2013.01)

(58) Field of Classification Search
CPC ............ G02B 21/0032; G02B 21/0036; G02B 21/125; G02B 21/361; G02B 21/365;
(Continued)

(56) References Cited

U.S. PATENT DOCUMENTS 6,195,451 B1 *   2/2001   Kerschmann ............. G06T 5/50
                                                                382/133
2024/0077412 A1   3/2024   Kano et al.
2025/0044235 A1 *  2/2025   Ohno ................. G01N 21/8806

FOREIGN PATENT DOCUMENTS

CN          104155299 A      11/2014
JP          H7-60216 B2       6/1995
(Continued)

OTHER PUBLICATIONS

J.W. Hosch et al., "High spatial resolution schlieren photography," Applied Optics, vol. 16, No. 2, pp. 473-482 (1977).
(Continued)

*Primary Examiner* — Arnel C Lavarias

(74) *Attorney, Agent, or Firm* — Finnegan, Henderson, Farabow, Garrett & Dunner, LLP

(57)      ABSTRACT

According to the embodiment, an optical measurement method includes: forming an object image including at least a part of the object by a bright-field optical system, and capturing and acquiring object image data by an imaging element configured to distinguish spectrums including first and second wavelengths by each pixel; performing dark-field conversions for the first wavelength to obtain first converted image data and for the second wavelength to obtain second converted image data, based on the object image data; performing hue generation processing of generating hue image data based on the first and second converted image data; and estimating information regarding a physical property of the object based on the hue image data.

16 Claims, 10 Drawing Sheets

(58) Field of Classification Search
    CPC .... G02B 21/00; G02B 21/0004; G02B 21/06;
                G02B 21/08; G02B 21/10; G02B 21/12;
                G02B 21/36; G02B 21/367; G02B 27/42;
                    G02B 27/4266; G02B 27/44; G02B
                                27/46; G02B 27/0025
    USPC ....... 359/385, 362, 363, 368, 369, 387, 388,
                                359/389, 390, 558, 559
    See application file for complete search history.

(56)                   References Cited

FOREIGN PATENT DOCUMENTS

| JP | 4111614 B2 | 7/2008 |
|----|------------|--------|
| JP | 2024-37127 A | 3/2024 |

OTHER PUBLICATIONS

Hiroya Kano et al., U.S. Appl. U.S. Appl. No. 18/174,684, filed Feb. 27, 2023.
Japan Patent Office, Office Action in JP App. No. 2023-045785 (Dec. 23, 2025).
Hiroya Kano et al., "Density Prediction of Micro-structure Object by Hue Analysis of Schlieren Image," Proc. of 70th Spring Meeting of Japan Soc. of Appl. Phys., 1 page (2023).
Taean Chang et al., "Computational approach to dark-field optical diffraction tomography," APL Photon., vol. 5, No. 040804, DOI: 10.1063/1.5130529, 11 pages (2020).

* cited by examiner

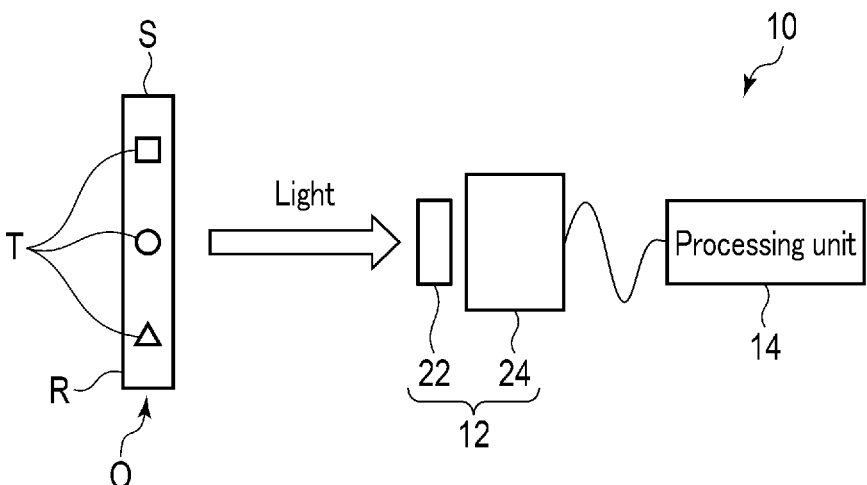
F I G. 1

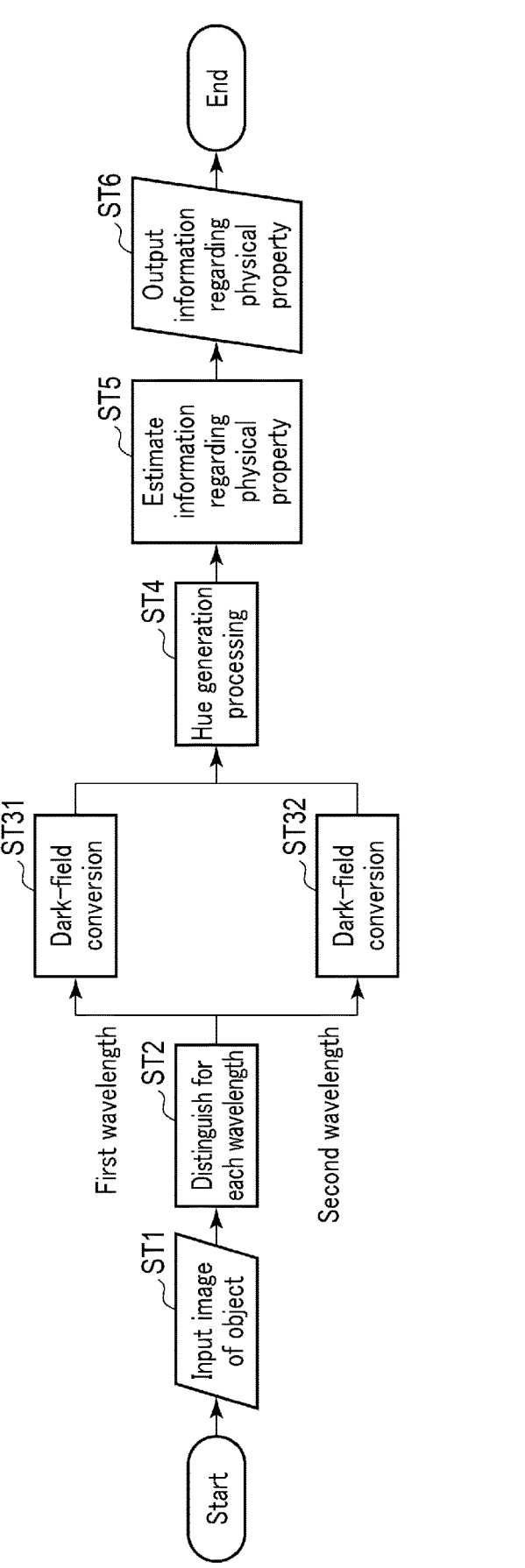
F I G. 2

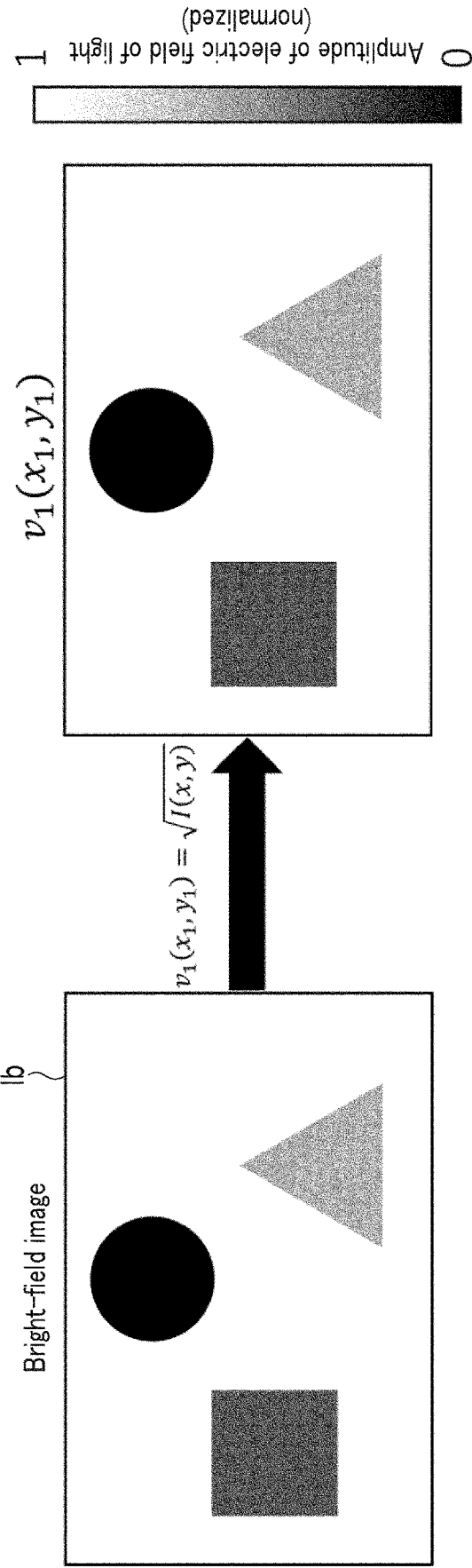
F I G. 4

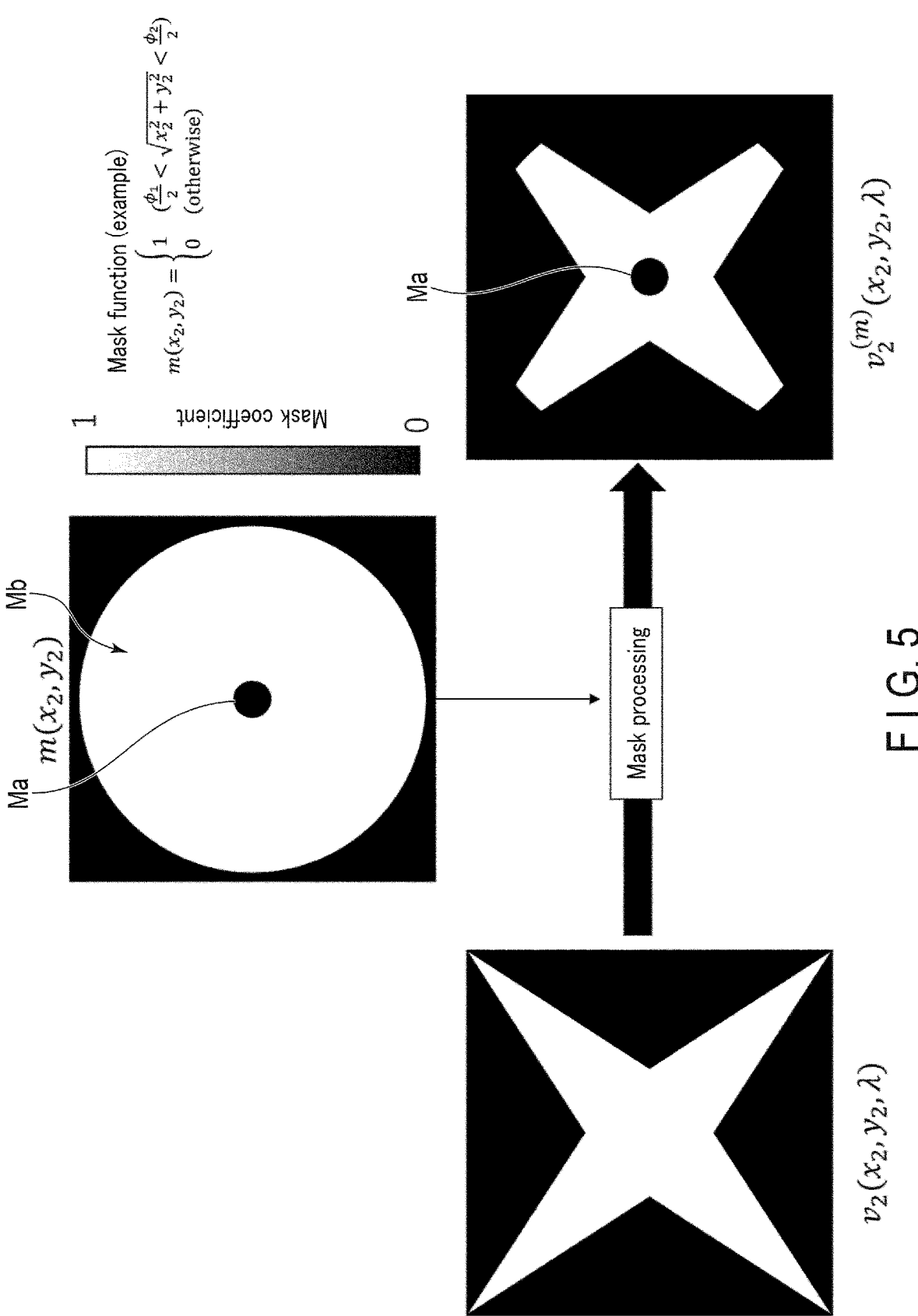
F I G. 5

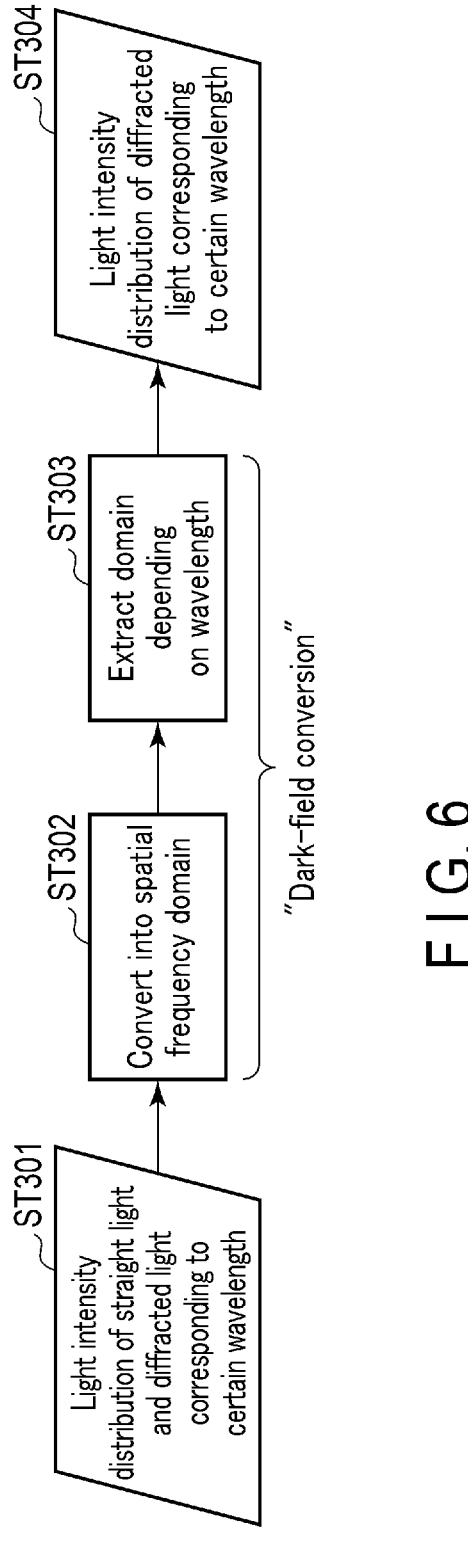
F I G. 6

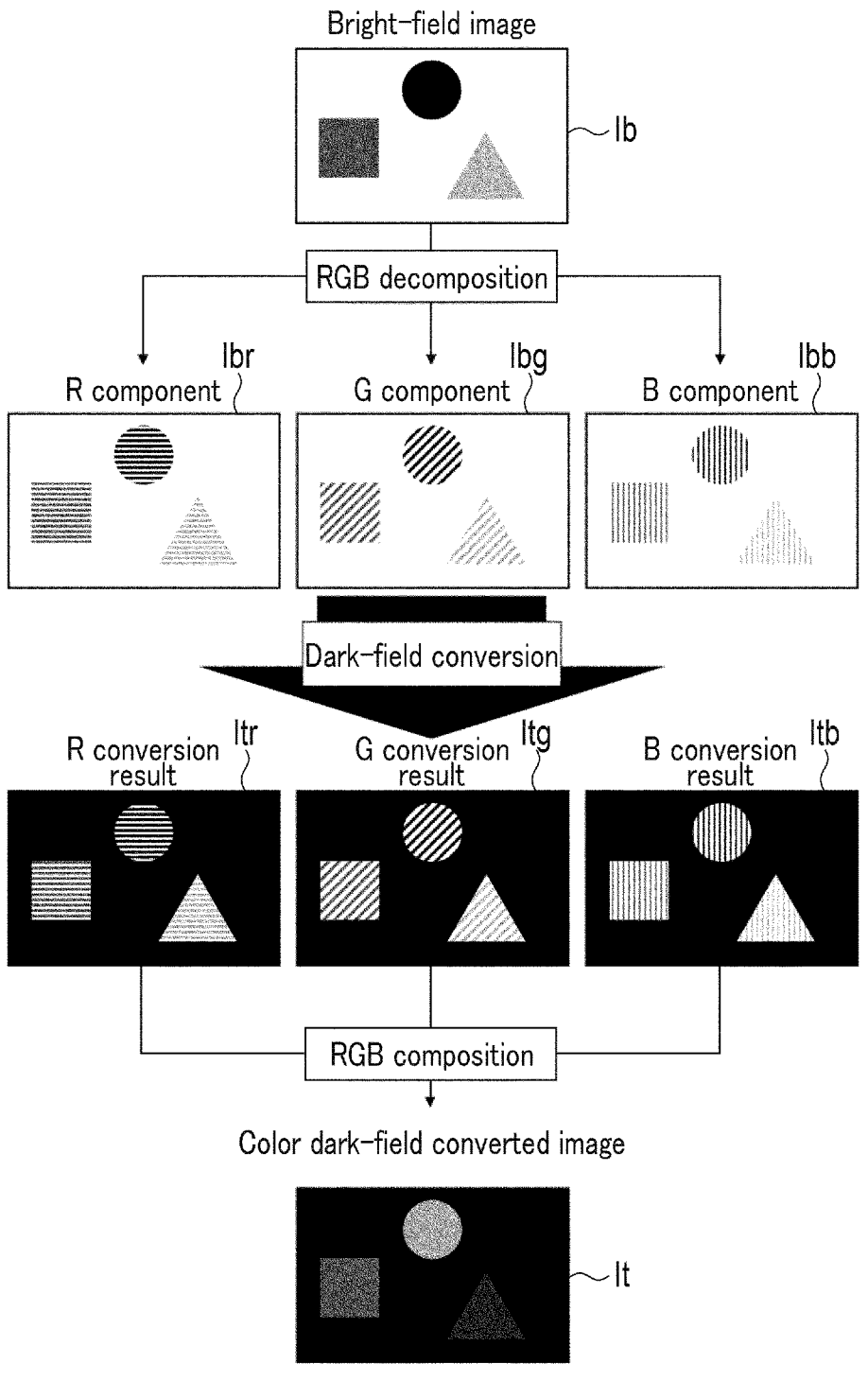
F I G. 7

It
Color dark-field
converted image
Color dark-field converted image
captured by dark-field optical system
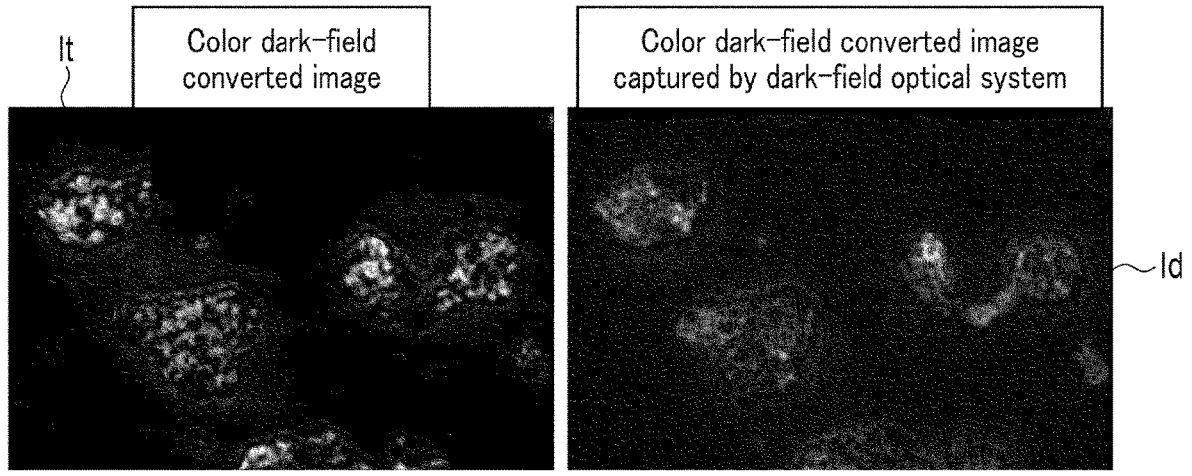
~Id
F I G. 8

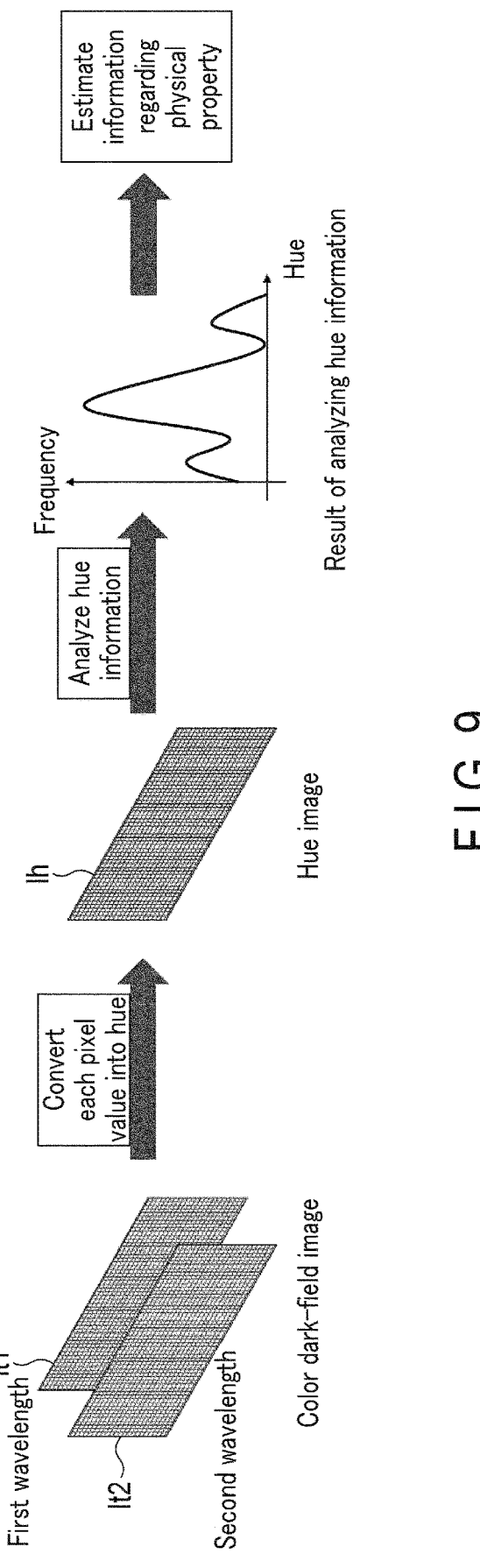
F I G. 9

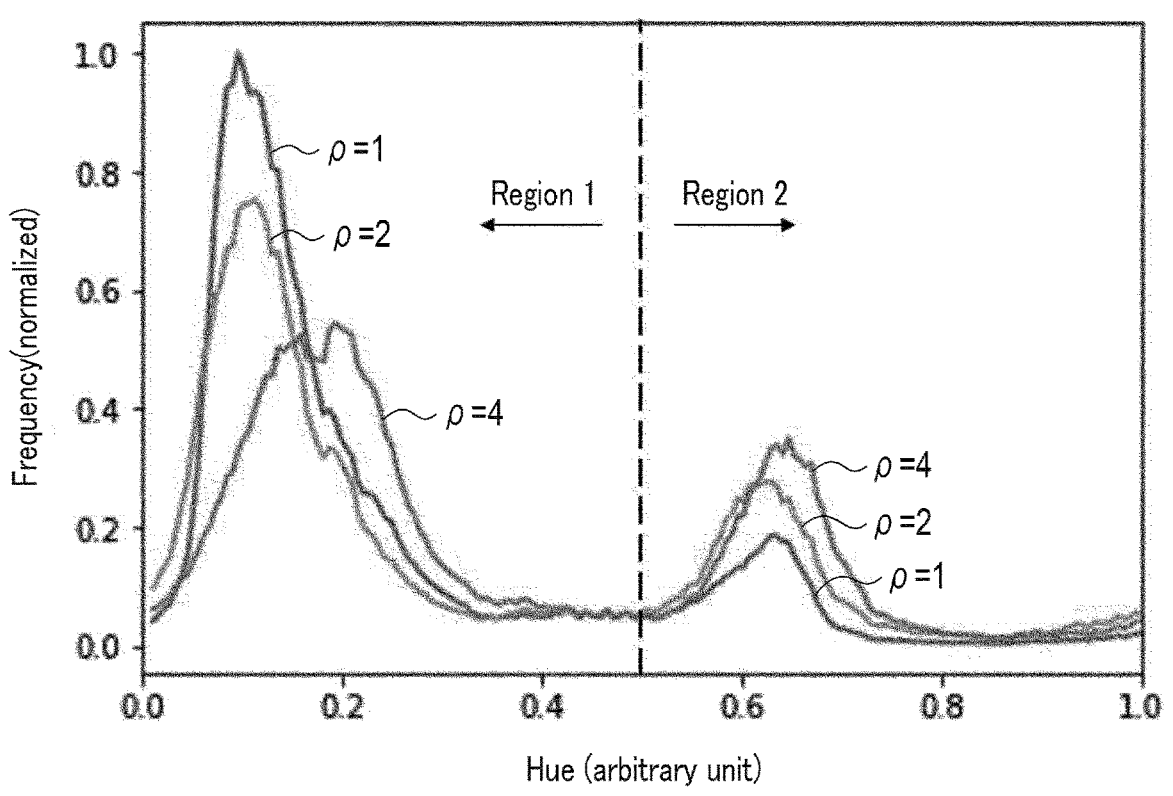
F I G. 10
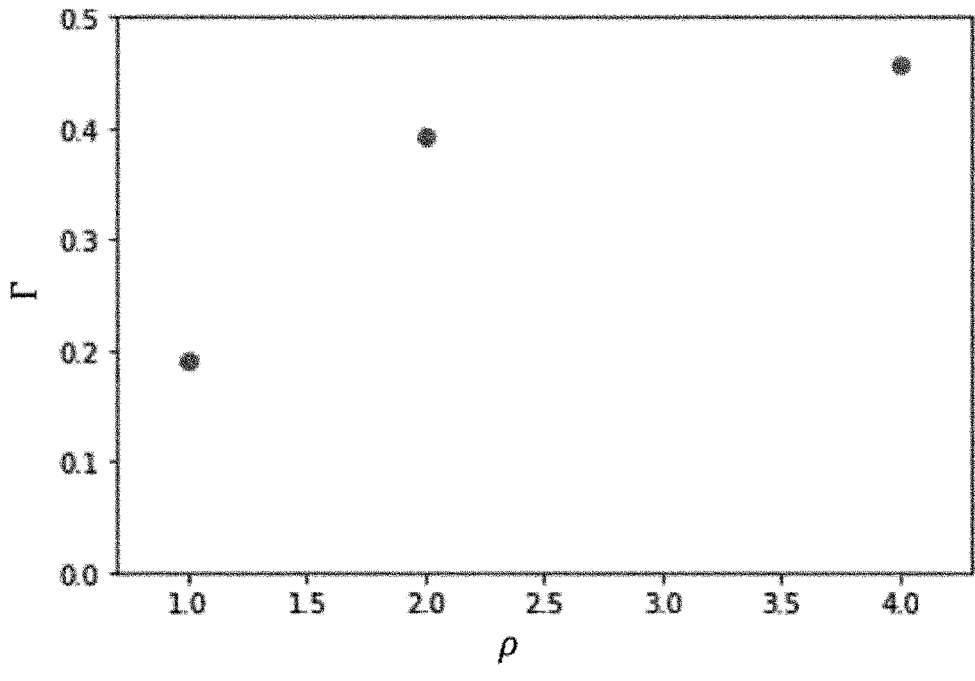
F I G. 11

OPTICAL MEASUREMENT METHOD, OPTICAL MEASUREMENT APPARATUS, AND NON-TRANSITORY STORAGE MEDIUM STORING OPTICAL MEASUREMENT PROGRAM

CROSS-REFERENCE TO RELATED APPLICATIONS

This application is based upon and claims the benefit of priority from Japanese Patent Application No. 2023-045785, filed Mar. 22, 2023, the entire contents of all of which are incorporated herein by reference.

FIELD

Embodiments described herein relate generally to an optical measurement method, an optical measurement apparatus, and a non-transitory storage medium storing an optical measurement program.

BACKGROUND

An optical method for measuring information regarding the shape, size, and physical properties of an appropriate object (target) is important. For example, when an object having an appropriate structure is irradiated with light, diffraction of light occurs that depends on the structure of the object. Therefore, in a case where a spatial intensity distribution of the diffracted light is known, information regarding physical properties such as the structure and density distribution of the object can be estimated from the spatial intensity distribution. Furthermore, the diffracted light depends on a wavelength. Therefore, in a case where an intensity distribution of the diffracted light is known for each wavelength, information regarding physical properties such as a finer structure and a density distribution can be estimated.

BRIEF DESCRIPTION OF THE DRAWINGS

FIG. 1 is a schematic diagram illustrating an optical measurement apparatus according to an embodiment.

FIG. 2 is a flowchart of an optical measurement method performed by a processing unit of the optical measurement apparatus illustrated in FIG. 1.

FIG. 4 is a diagram illustrating a relationship between a pixel value of an object acquired by an imaging element and an electric field distribution (an electric field distribution of light immediately after transmission of the light through the object (sample) calculated from input of a bright-field image) of light immediately after transmission of the light through the object (sample) in the optical measurement apparatus according to the embodiment.

FIG. 5 is a schematic diagram illustrating a state in which a mask (upper diagram) of the dark-field optical system to be modeled is superimposed on an electric field distribution (left diagram) on a mask plane according to the present embodiment and mask processing (right diagram) is performed in the optical measurement apparatus according to the embodiment.

FIG. 6 is a chart of dark-field conversion.

FIG. 7 is a chart for acquiring a dark-field converted image from a bright-field image.

FIG. 8 is a diagram illustrating a color dark-field converted image (left diagram) and a dark-field image (right diagram) captured by the dark-field optical system for the same subject.

FIG. 9 is a schematic diagram illustrating a procedure of a hue generation processing method and a method for estimating information regarding a physical property.

FIG. 10 is a diagram illustrating a hue histogram indicating a relationship between a hue and frequency of a hue image of a floc as an object in water treatment.

FIG. 11 is a diagram illustrating a relationship between a concentration ratio and an area ratio of the histogram illustrated in FIG. 10.

DETAILED DESCRIPTION

Figure 3:
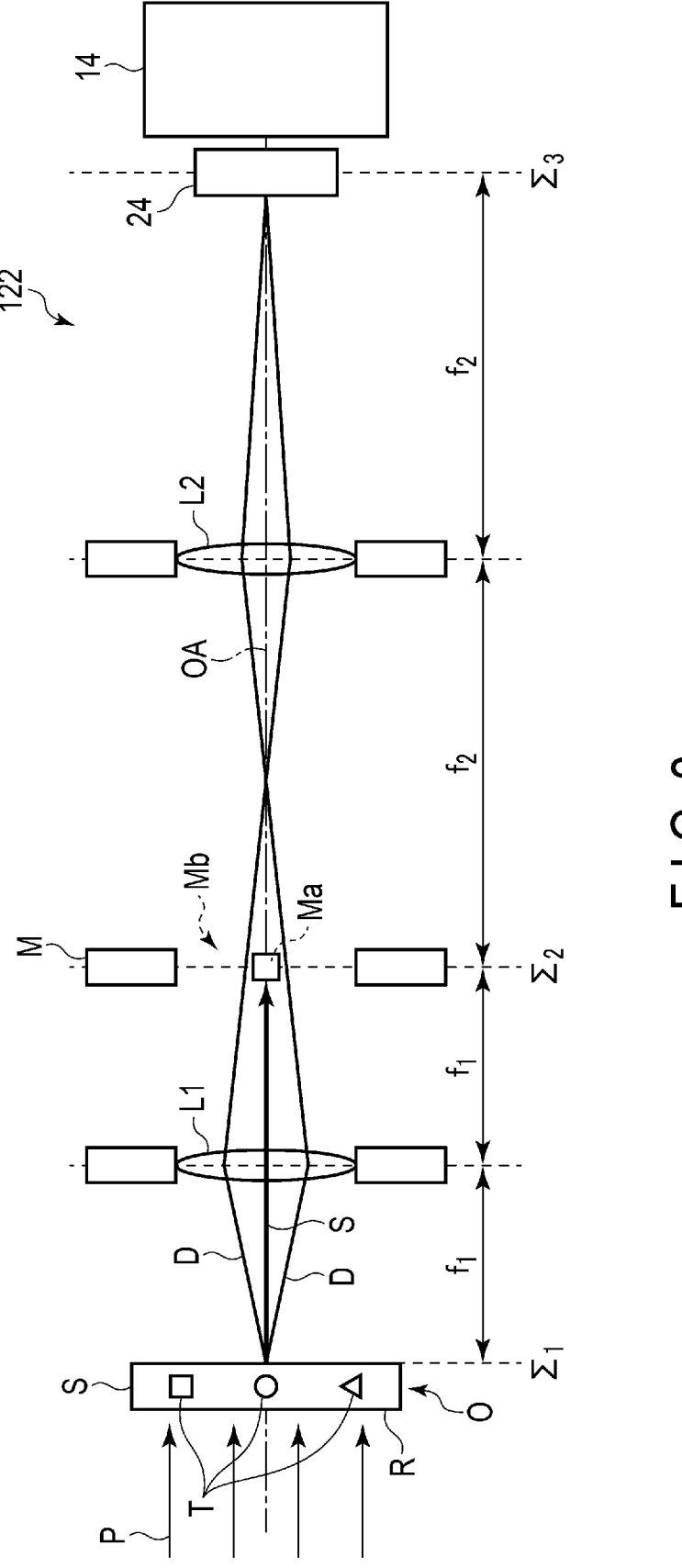
FIG. 3 is a schematic diagram illustrating an example of a dark-field optical system to be modeled in the optical measurement apparatus according to the embodiment.

It is an object of an embodiment to provide an optical measurement method, an optical measurement apparatus, and a non-transitory storage medium storing an optical measurement program, which are configured to estimate information regarding a physical property of an object (target) having an appropriate structure, for example.

According to the embodiment, an optical measurement method comprising: illuminating an object with illuminating light having a first wavelength and a second wavelength different from the first wavelength, forming an object image including at least a part of the object by a bright-field optical system, and capturing and acquiring object image data by an imaging element configured to distinguish a spectrum including the first wavelength and a spectrum including the second wavelength by each pixel; performing dark-field conversion for the first wavelength based on the object image data to obtain first converted image data; performing dark-field conversion for the second wavelength based on the object image data to obtain second converted image data; performing hue generation processing of generating hue image data based on the first converted image data and the second converted image data; and estimating information regarding a physical property of the object based on the hue image data.

In the present embodiment, a method for measuring information regarding a physical property of an object (subject) from an object (target) image (hereinafter, it may be referred to as a bright-field image) captured by a general imaging optical system will be described with reference to FIGS. 1 to 11.

FIG. 1 illustrates a schematic diagram of an overall configuration of an optical measurement apparatus 10 according to the present embodiment. FIG. 2 is a flowchart of an optical measurement method (an optical measurement program stored in a non-transitory storage medium) using the optical measurement apparatus 10 according to the present embodiment.

As illustrated in FIG. 1, the optical measurement apparatus 10 according to the present embodiment includes an imaging unit 12 and a processing unit 14.

In the present embodiment, light is a type of electromagnetic wave, and includes an X-ray, an ultraviolet ray, visible light, an infrared ray, a microwave, and the like. In the present embodiment, light is visible light, and for example, a wavelength of the light is in a region of 400 nm to 750 nm.

The imaging unit 12 includes an imaging optical system (bright-field optical system) 22 and an imaging element (image sensor) 24.

As the imaging optical system 22, a general bright-field optical system can be used. As the imaging optical system 22, various optical systems can be used as long as an object image including at least a part of an object O can be formed on the imaging element 24. For example, one or a plurality of lenses can be used as the imaging optical system 22. It may be unnecessary to set a dark-field optical system 122 (see FIG. 3) as the imaging optical system 22.

A plane including a region where the imaging element 24 is disposed is defined as an imaging plane of the imaging optical system 22. For example, an area sensor is used as the imaging element 24. The area sensor is a sensor in which pixels are arrayed in an area shape in the same plane. The imaging element 24 according to the present embodiment includes a plurality of pixels. It is preferable to use a so-called RGB camera in which each pixel can receive light beams of at least two different wavelength spectra, that is, a light beam of a first wavelength spectrum and a light beam of a second wavelength spectrum having a wavelength different from the first wavelength spectrum. Each of the pixels of the imaging element 24 preferably includes color channels enabling distinctive reception of light of a plurality of predetermined wavelength spectra, like three channels for R, G, and B. However, the independent pixels may be provided for R, G, and B, or the respective pixels for R, G, and B may be collectively considered as a single pixel. In the present embodiment, each of the pixels of the imaging element 24 includes at least two color channels for red (R) and blue (B). Therefore, it is assumed that the imaging element 24 can receive, at each pixel, blue (B) light having a wavelength of 450 nm and red (R) light having a wavelength of 650 nm through the independent color channels. The imaging element 24 according to the present embodiment can also receive, for example, green (G) light having a wavelength of 550 nm through an independent color channel. For example, it is assumed that blue (B) light is received through a first color channel, red (R) light is received through a second color channel, and green (G) light is received through a third color channel.

As described above, the imaging element 24 according to the present embodiment has the plurality of pixels, and can distinguish a spectrum including at least two wavelengths by each of the pixels. Therefore, the imaging element 24 can distinguish a spectrum including the first wavelength (for example, B light) and a spectrum including the second wavelength (for example, R light) by each of the pixels. Furthermore, the imaging element 24 can distinguish a spectrum including the third wavelength (for example, G light) by each of the pixels.

As the imaging element 24, a general imaging element can be used. For example, a charge-coupled device (CCD) can be used as the imaging element 24. For example, a single-plate type color CCD or a three-plate type color CCD may be used as the imaging element 24. The imaging element 24 is not limited to a CCD, and may be an imaging sensor such as a complementary metal-oxide semiconductor (CMOS) or a light-receiving element.

The processing unit 14 includes, for example, a computer and the like, and includes a processor (processing circuit) and a storage medium. The processor includes any of a central processing unit (CPU), an application specific integrated circuit (ASIC), a microcomputer, a field programmable gate array (FPGA), a digital signal processor (DSP), and the like. The storage medium may include a non-transitory auxiliary storage device in addition to a main storage device such as a memory. Examples of the storage medium include a hard disk drive (HDD), a solid state drive (SSD), a magnetic disk, optical discs (CD-ROM, CD-R, DVD, and the like), magneto-optical discs (MO and the like), and a non-volatile memory that is a semiconductor memory or the like and is writable and readable at any time.

In the processing unit 14, only one processor and only one storage medium may be provided, or a plurality of processors and a plurality of storage media may be provided. In the processing unit 14, the processor performs processing by executing a program or the like stored in the storage medium or the like. Furthermore, the program executed by the processor of the processing unit 14 may be stored in a computer (server) connected to the processing unit 14 via a network such as the Internet, a server in a cloud environment, or the like. In this case, the processor downloads the program via the network.

In the processing unit 14, acquisition of an image from the imaging element 24 and various types of calculation processing based on the image acquired from the imaging element 24 are executed by the processor or the like, and the storage medium functions as a data storage unit.

Furthermore, at least a part of the processing by the processing unit 14 may be executed by a cloud server configured in a cloud environment. The infrastructure of the cloud environment includes a virtual processor such as a virtual CPU and a cloud memory. In one example, acquisition of an image from the imaging element 24 and various types of calculation processing based on the image acquired from the imaging element 24 are executed by the virtual processor, and the cloud memory functions as a data storage unit.

In the present embodiment, the processor of the processing unit 14 controls the imaging element 24 and performs various calculations on image data obtained from the imaging element 24.

Furthermore, although not illustrated, the optical measurement apparatus 10 may include an illuminator (not illustrated) that illuminates the object O with illuminating light including at least two wavelengths (a first wavelength and a second wavelength different from the first wavelength). The illumining light of the illuminator is not limited to parallel light (straight light), and may not be parallel light. As the illuminating light of the illuminator, for example, white light or light having a plurality of other wavelengths can be used. As an example, the first wavelength is a wavelength of 450 nm included in B (blue) light, and the second wavelength is a wavelength of 650 nm included in R (red) light. However, the present embodiment is not limited thereto, and each of the wavelengths may be any wavelength. Note that the illuminator is preferably controlled by the processing unit 14.

A procedure of performing an optical measurement method according to the present embodiment using the optical measurement apparatus 10 according to the present embodiment will be briefly described. The optical measurement program related to the optical measurement method according to the present embodiment is stored in the non-transitory storage device.

First, the processing unit 14 controls the imaging element 24 of the imaging unit 12 of the optical measurement apparatus 10 illustrated in FIG. 1 to capture a bright-field image (object image data) Ib of the object O by the imaging element 24. As an example, the object image data Ib includes straight light and diffracted light when parallel light is transmitted through the object O. Then, the processing unit 14 acquires the image Ib of the object O from the imaging element 24. That is, the image Ib of the object O is input to the processing unit 14 (step ST1). The image Ib of the object O input to the processing unit 14 may be stored in a storage medium such as an SSD. That is, in a case where the image data Ib of the object O to which the optical measurement method is applied is present, the imaging unit 12 of the optical measurement apparatus 10 may be unnecessary.

The processing unit 14 distinguishes the bright-field image Ib for each wavelength, that is, for each color (step ST2). In this case, the processing unit 14 distinguishes the bright-field image Ib into two wavelengths. The processing unit 14 may distinguish the bright-field image Ib into three or more wavelengths in accordance with the number of channels of the imaging element 24.

Then, the processing unit 14 performs processing called dark-field conversion on each wavelength component of the bright-field image Ib (steps ST31 and ST32). This dark-field conversion is implemented by modeling the dark-field optical system 122 illustrated in FIG. 3 so as to acquire an image (dark-field image) Id obtained by extracting light diffracted in the object O, and the processing unit 14 can generate a color dark-field converted image It reflecting the wavelength dependence of the diffracted light based on the bright-field image Ib.

The processing unit 14 performs hue generation processing of extracting hue information included in the color dark-field converted image It (color image data) (step ST4).

Then, after performing the hue generation processing, the processing unit 14 can estimate information regarding a physical property of the object (target) based on the information subjected to the hue generation processing (step ST5).

The processing unit 14 outputs the estimated information regarding the physical property to a monitor (not illustrated) or the like (step ST6). The estimated information regarding the physical property is also preferably used as an index for various types of control.

Therefore, the object image Ib to be acquired or already acquired using the bright-field optical system 22, and the processing unit 14 are required for the present method, and the dark-field optical system 122 and the imaging unit 12 are not necessarily required. Each item will be specifically described below.

Here, the dark-field optical system 122 to be modeled in this example will be described with reference to FIG. 3. FIG. 3 illustrates an example of a configuration of the dark-field optical system 122 to be modeled.

In a case where the dark-field optical system 122 illustrated in FIG. 3 is used, the processing unit 14 controls the illuminator so as to emit parallel light P parallel to an optical axis OA from the illuminator. Although the parallel light P from the illuminator is an example, a solvent S and a target T in a reservoir R of the object (inspection object) 0 are irradiated with the parallel light P. Through the reservoir R and the solvent S illustrated in FIG. 3, the illuminating light from the illuminator needs to be transmitted.

In this case, a plane perpendicular to the optical axis OA of the dark-field optical system 122 immediately after transmission of the light through the object (sample) O is $\Sigma_1$. On the plane $\Sigma_1$, the light is separated into light (diffracted light) D diffracted depending on information regarding a physical property of the target T in the object O and light (straight light) B traveling straight through the solvent S. A lens L1 and a light-blocking region Ma of a mask M are arranged behind the object O (on the optical path of the straight light B). In this case, a plane that is perpendicular to the optical axis OA and where the mask M is present is $\Sigma_2$. The plane $\Sigma_2$ is separated from the lens L1 by the focal length f1 of the lens L1, and the plane $\Sigma_1$ and the lens L1 are separated from each other by the focal length f1 of the lens L1. Furthermore, a lens L2 is provided between the mask M and the imaging element 24. The distance between the plane $\Sigma_2$ and the lens L2 and the distance between the lens L2 and an imaging plane $\Sigma_3$ of the imaging element 24 are equal to the focal length f2 of the lens L2.

The parallel light P (straight light B) that was emitted to the object O, did not hit the target T, and passed through the reservoir R and the solvent S reaches the light-blocking region Ma of the mask M through the lens L1. The light-blocking region Ma is the focal point of the lens L1. The size of the light-blocking region Ma is larger than the size of projection of the light from the light source (not illustrated) of the parallel light P onto the light-blocking region Ma. Therefore, the parallel light P (straight light B) is blocked by the light-blocking region Ma and does not reach the imaging element 24. Therefore, the light-blocking region Ma of the mask M blocks the straight light B.

The diffracted light D due to the light diffraction is directed to the lens L1 while being in a state of deviating from the optical axis OA along the parallel light P. The diffracted light D incident on the lens L1 and having passed through the lens L1 passes through a passage region Mb of the mask M shifted from the light-blocking region Ma present on the optical axis OA. That is, through the passage region Mb arranged at a focal point of a focal plane f1 of the lens L1, the diffracted light D of the parallel light P that was directed in a direction different from the direction of the parallel light P by the target T passes.

The diffracted light D having passed through the passage region Mb of the mask M is incident on the imaging plane $\Sigma_3$ of the imaging element 24 through the lens L2. In this case, the processing unit 14 causes the imaging element 24 to capture an image of light of at least two or more different wavelength spectra reaching the imaging plane $\Sigma_3$ of the imaging element 24 by each pixel simultaneously and distinctively. Therefore, the imaging element 24 acquires the dark-field image Id of the object O. In this case, the processing unit 14 acquires information regarding the target T different from the solvent S in a non-contact manner based on the dark-field image Id captured by the imaging element 24. Examples of the information regarding the target T include the shape, contour, size, and the like of the target T.

The parallel light P (straight light B) that was emitted to the object O, did not hit the target T, and passed through the reservoir R and the solvent S reaches the light-blocking region Ma of the mask M that is at the focal point of the lens L1 through the lens L1, and does not reach the imaging element 24. Therefore, the diffracted light D is imaged in the imaging element 24. Therefore, it can be said that the dark-field image Id obtained using the dark-field optical system 122 illustrated in FIG. 3 reflects structural information of the target T in the solvent S.

Incidentally, the angle of diffraction of the diffracted light D varies according to the wavelength. In general, the angle of diffraction may increase as the wavelength increases. Regarding blue light (first wavelength) at 450 nm and red light (second wavelength) at 650 nm, the angle of diffraction of the red light is larger than the angle of diffraction of the blue light, that is, the angles of diffraction may be different. The imaging element 24 distinguishes light having at least two or more different wavelength spectra and captures an image of the light by each pixel simultaneously. Therefore, the bright-field optical system 22 illustrated in FIG. 1 can use the imaging element 24 to acquire the wavelength dependence (image having a color) of directional distribution of the diffracted light D generated in the target T in the solvent S.

As described above, the image obtained by the imaging element 24 via the dark-field optical system 122 reflects the information regarding the wavelength dependence of directional distribution of the diffracted light D and the structural information of the target T. The processing unit 14 of the dark-field optical system 122 illustrated in FIG. 3 controls the imaging element 24 to acquire the wavelength dependence of directional distribution of the diffracted light D generated in the target T in the solvent S and the structural information of the target T using the imaging element 24.

Next, the image data Ib input to the model using the bright-field optical system 22 according to the present embodiment will be described. Normally, both intensity modulation and phase modulation that occur in the object O need to be considered in order to estimate the information regarding the physical property of the object O using the diffracted light. A method for estimating the information regarding the physical property of the object O assuming only the intensity modulation in the optical measurement method according to the present embodiment will be described. A specific method will be described below.

For the following description, a coordinate system corresponding to the dark-field optical system 122 illustrated in FIG. 3 is virtually defined for the imaging unit 12 (the bright-field optical system 22 and the imaging element 24) illustrated in FIG. 1. An optical axis OA is defined as a z axis, and a plane perpendicular to the optical axis OA of the bright-field optical system 22 immediately after transmission of light through the object (sample) O is defined as $\Sigma_1$. Similarly, a plane that is perpendicular to the optical axis OA and where a mask M is assumed to be present is $\Sigma_2$, and a virtual plane that is an imaging plane (light receiving plane) of the imaging element 24 and is perpendicular to the optical axis OA is $\Sigma_3$. The plane $\Sigma_2$ is between the plane $\Sigma_1$ and the plane $\Sigma_3$. It is assumed that the plane $\Sigma_2$ is located at a position separated from the position where a lens L1 of the bright-field optical system 22 is present by a focal length f1 of the lens L1. It is assumed that the plane $\Sigma_3$ is located at a position separated from the position where a lens L2 of the bright-field optical system 22 is present by a focal length f2 of the lens L2. In-plane coordinates of the plane $\Sigma_1$ are represented by orthogonal coordinates $(x_1, y_1)$ with the optical axis OA with the intersection point with the optical axis OA (z axis) as the origin. In-plane coordinates of the plane $\Sigma_2$ are represented by $(x_2, y_2)$, and in-plane coordinates of the plane $\Sigma_3$ are represented by $(x_3, y_3)$. It is assumed that $x_1$, $x_2$, and $x_3$ axes orthogonal to the z axis are parallel to each other, and that $y_1$, $y_2$, and $y_3$ axes orthogonal to the z axis are parallel to each other. In addition, the lenses L1 and L2 and the mask M are thin optical elements whose thicknesses can be ignored.

First, the processing unit 14 captures the bright-field image Ib of the object O using the bright-field optical system 22 illustrated in FIG. 1. Examples of the object O include the reservoir R, the solvent S contained in the reservoir R, and the target T present in the solvent S. As an example, the optical measurement apparatus 10 according to the present embodiment can obtain the object O as the image data Ib as illustrated in the left diagram of FIG. 4 by the bright-field optical system 22 and the imaging element 24.

The processing unit 14 acquires the image Ib as the shape of the target T and performs calculation (image processing) to find the shape of the target T and the size of the target T. Therefore, the processing unit 14 can estimate the area (surface area) of the target T. In addition, the optical measurement apparatus 10 can estimate the volume T of the target T by integrating the area (surface area) of the target T.

A pixel value of each pixel in the bright-field image Ib (each pixel value in each channel for a color image) is I(x, y). Since pixel values I(x, y) represent an intensity distribution (light intensity distribution of, for example, straight light and diffracted light corresponding to a certain wavelength) of light, the pixel values I(x, y) and an electric field distribution v(x, y) of the light have a relationship of the following expression (1) (step ST301).

$$I(x, y) \propto |v(x, y)|^2 \qquad (1)$$

Therefore, the electric field distribution $v_1(x_1, y_1)$ of the light on the plane $\Sigma_1$ immediately after the transmission of the light through the object (sample) O is expressed as, for example, expression (2).

$$v_1(x_1, y_1) = \sqrt{I(x, y)} \qquad (2)$$

The electric field distribution $v_1(x_1, y_1)$ of the light on the plane $\Sigma_1$ immediately after the transmission of the light through the object (sample) O is set as an input of the bright-field image Ib of the model (see the right diagram of FIG. 4). Furthermore, in a case where the phase modulation occurring in the object O is small, the processing unit 14 can theoretically derive the color dark-field converted image It corresponding to the dark-field image Id according to the present method. This can be explained as follows.

In a case where the light is transmitted through the object O, the electric field distribution v(x, y) on the plane $\Sigma_1$ after the transmission of the light through the object generally becomes a complex function. However, in a case where the phase modulation occurring in the object O is small, an imaginary part of the electric field distribution v(x, y) is minute, and thus, it is sufficient to consider substantially only a real part of the electric field distribution v(x, y).

Therefore, by inputting the electric field distribution $v_1(x_1, y_1)$ of the light on the plane $\Sigma_1$ immediately after the transmission of the light through the object (sample) O, that is, the bright-field image Ib to the processing unit 14 according to the expression (1) and the expression (2), the color dark-field converted image It corresponding to the dark-field image Id can be theoretically calculated.

In fact, when an optical inspection method constructed in this example was applied to the object O (sample) containing the target T, which is called a floc generated at the time of water treatment using, for example, a water treatment system, the effectiveness was confirmed. Embodiments and results thereof will be described later.

Next, the processing unit 14 performs calculation (processing) for acquiring the dark-field converted image It based on the input image data Ib. As described above, the dark-field optical system 122 (see FIG. 3) modeled in this example extracts the diffracted light through the two lenses L1 and L2 and the light-blocking region Ma of the mask M arranged therebetween. Hereinafter, the calculation of the dark-field image Id by the processing unit 14 through this process is referred to as "dark-field conversion". The dark-field conversion is divided into three stages, a diffraction process, a light-blocking process, and an imaging process. This is the same as that in acquiring the dark-field image Id using the dark-field optical system 122 through a process similar to that in acquiring, by the imaging element 24, the image of the light diffracted by the object O and blocked by the light-blocking region Ma of the mask M. Among them, the diffraction process and the imaging process can be theoretically described using a diffraction phenomenon of light. Furthermore, the Fraunhofer diffraction approximation can be applied in the arrangement as illustrated in FIG. 3.

First, the diffraction process will be described.

Assuming that the electric field distribution of the light on the plane $\Sigma_1$ immediately after the transmission of the light through the object O (sample) is $v_1(x_1, y_1, \lambda)$ and the electric field distribution of the light on the mask plane $\Sigma_2$ is $v_2(x_2, y_2, \lambda)$, Fraunhofer diffraction is expressed by the following expression (3).

$$v_2(x_2, y_2, \lambda) = \tag{3}$$
$$\frac{\exp(ikf_1)}{i\lambda f_1} \int_{-\infty}^{\infty} \int_{-\infty}^{\infty} v_1(x_1, y_1, \lambda) \exp\left[-\frac{ik}{f_1}(x_1 x_2 + y_1 y_2)\right] dx_1 dy_1$$

Furthermore, appropriate variable conversion (hereinafter, referred to as normalization) is performed on Equation (3). Specifically, the variable conversion is expressed as expressions (4A) to (4F) (a1 is an arbitrary constant).

$$x_1' = \frac{x_1}{(a_1/2)} \tag{4A}$$

$$y_1' = \frac{y_1}{(a_1/2)} \tag{4B}$$

$$x_2' = \frac{(a_1/2)}{\lambda f_1} x_2 \tag{4C}$$

$$y_2' = \frac{(a_1/2)}{\lambda f_1} y_2 \tag{4D}$$

$$v_1'(x_1', y_1', \lambda) = \frac{a_1}{2} v_1(x_1, y_1, \lambda) \tag{4E}$$

$$v_2'(x_2', y_2', \lambda) = \frac{\lambda f_1}{(a_1/2)} v_2(x_2, y_2, \lambda) \tag{4F}$$

That is, the normalization is coordinate conversion of scaling the electric field distribution $v_1(x_1, y_1, \lambda)$ on the plane $\Sigma_1$ immediately after the transmission of the light through the object O and the electric field distribution $v_2(x_2, y_2, \lambda)$ on the mask plane $\Sigma_2$ according to a wavelength A and the focal length f1 of the lens L1. In a case where the coordinate system after the normalization is represented by "'", expression (5) is obtained (step ST302).

$$v_2'(x_2', y_2', \lambda) = \int_{-\infty}^{\infty} \int_{-\infty}^{\infty} v_1'(x_1', y_1', \lambda) \exp\left[-2\pi i(x_1' x_2' + y_1' y_2')\right] dx_1' dy_1' \tag{5}$$

The expression (5) means that the electric field distribution $v_2(x_2, y_2, \lambda)$ on the mask plane $\Sigma_2$ can be calculated by performing Fourier transformation of the electric field distribution $v_1(x_1, y_1, \lambda)$ on the plane $\Sigma_1$ immediately after the transmission of the light through the object O.

Subsequently, the light blocking process will be described with reference to FIG. 5.

In the light blocking process, the effect was applied to the electric field distribution $v_2(x_2, y_2, \lambda)$ of the light on the mask plane $\Sigma_2$ previously calculated by a process of setting a value close to $(x_2, y_2)=(0, 0)$ corresponding to a non-diffracted light component to zero (step ST303). That is, as illustrated in FIG. 5, the processing unit 14 virtually superimposes the same regions (upper diagram) as the light-blocking region Ma and the passage region Mb of the mask M of the dark-field optical system 122 to be modeled on the electric field distribution $v_2(x_2, y_2, \lambda)$ (left diagram in FIG. 5) on the mask plane $\Sigma_2$ according to the present embodiment, and performs mask processing (right diagram in FIG. 5) on the electric field distribution $v_2(x_2, y_2, \lambda)$ on the mask plane $\Sigma_2$. Therefore, it can be said that, in this mask processing, processing similar to the processing of blocking the straight light of the parallel light is performed in the light-blocking region Ma of the mask M of the dark-field optical system 122 illustrated in FIG. 3. In a case where a function corresponding to the mask M is $m(x_2, y_2)$, an optical electric field distribution $v_2^{(m)}(x_2, y_2, \lambda)$ after the light blocking process is expressed by the following expression (6).

$$v_2^{(m)}(x_2, y_2, \lambda) = m(x_2, y_2)v_2(x_2, y_2, \lambda) \tag{6}$$

As can be seen from the fact that the electric field distribution $v_2(x_2, y_2, \lambda)$ on the mask plane $\Sigma_2$ expressed by the expression (3) is calculated by performing Fourier transformation on the electric field distribution $v_1(x_1, y_1, \lambda)$ on the plane $\Sigma_1$ immediately after the transmission of the light through the object O, the electric field distribution $v_2(x_2, y_2, \lambda)$ of the light on the mask plane $\Sigma_2$ corresponds to the electric field distribution $v_1(x_1, y_1, \lambda)$ on the plane (sample plane) $\Sigma_1$ immediately after the transmission of the light through the object O in a spatial frequency domain. Therefore, it can be said that the processing represented by the expression (6) is mask processing of extracting spatial frequency domains different for each wavelength on the mask plane $\Sigma_2$.

The last imaging process corresponds to a time reversal of the diffraction process. Therefore, it is possible to perform association similar to the expression (3), and a final electric field distribution $v_3(x_3, y_3, \lambda)$ of the light on the imaging plane $\Sigma_3$ of the imaging element 24 is expressed by expression (7) using the optical electric field distribution $v_2^{(m)}(x_2, y_2, \lambda)$ after the light blocking process.

$$v_3(x_3, y_3, \lambda) = \tag{7}$$
$$\frac{1}{\lambda f_2} \int_{-\infty}^{\infty} \int_{-\infty}^{\infty} v_2^{(m)}(x_2, y_2, \lambda) \exp\left[-\frac{2\pi i}{\lambda f_2}(x_2 x_3 + y_2 y_3)\right] dx_2 dy_2$$

Therefore, based on the image Ib (electric field distribution $v_1(x_1, y_1, \lambda)$ on the plane $\Sigma_1$ immediately after the transmission of the light through the object O) of the object O as the input acquired by the bright-field optical system 22, the electric field distribution $v_3(x_3, y_3, \lambda)$ of the light on the imaging plane $\Sigma_3$ of the imaging element 24 subjected to the dark-field conversion is acquired. From the relationship between the expression (1) and the expression (2), a light intensity distribution of diffracted light corresponding to a certain wavelength is calculated based on the electric field distribution $v_3(x_3, y_3, \lambda)$ of the light on the imaging plane $\Sigma_3$ of the imaging element 24 (step ST304).

The procedure of the dark-field conversion is described above. FIG. 6 illustrates a simple chart (steps ST301 to ST304).

Next, calculation of the dark-field converted image It (Itb, Itr, and Itg) for each wavelength will be described.

As can be seen from the expression (3) and the expression (7), the electric field distribution $v_2(x_2, y_2, \lambda)$ of the diffracted light on the mask plane $\Sigma_2$ and the electric field distribution $v_3(x_3, y_3, \lambda)$ of the diffracted light on the imaging plane $\Sigma_3$ depend on the wavelength A. This means that each wavelength of the light in the dark-field converted image It, that is, color information has an important role in estimating the information regarding the physical property of the object O. Therefore, the processing unit 14 generated the color dark-field converted image It by executing the dark-field conversion on the input bright-field image Ib of the object O at each of a plurality of wavelengths A to obtain image pieces and finally merging the obtained image pieces.

For example, the processing unit 14 associates B light (first wavelength) with a wavelength of 450 nm, associates R light (second wavelength) with a wavelength of 650 nm, and associates G light (third wavelength) with a wavelength of 550 nm, and the processing unit 14 executes dark-field conversion on the B channel, the R channel, and the G channel of the bright-field image Ib. The processing unit 14 allocates results (converted image data Itb, Itr, and Itg) of the calculation to each of the B channel, the R channel, and the G channel of the color dark-field converted image It again, thereby generating the color dark-field converted image It reproducing the wavelength dependence of the diffracted light. That is, the processing unit 14 performs the dark-field conversion for the first wavelength (for example, B light (wavelength: 450 nm)) to obtain the first converted image data Itb. The processing unit 14 performs the dark-field conversion for the second wavelength (for example, R light (wavelength: 650 nm)) to obtain the second converted image data Itr. The processing unit 14 performs the dark-field conversion for the third wavelength (for example, G light (wavelength: 550 nm)) to obtain the third converted image data Itg.

FIG. 7 illustrates a chart until the processing unit 14 acquires the color dark-field converted image It based on the bright-field image Ib. The processing unit 14 generates images Ibb, Ibr, and Ibg obtained by decomposing the bright-field image Ib into the B channel (B component), the R channel (R component), and the G channel (G component), respectively. Then, the processing unit 14 performs the dark-field conversion for each wavelength (channel), that is, calculates the dark-field converted image Itb corresponding to the B component of the bright-field image Ib, calculates the dark-field converted image Itr corresponding to the R component, and calculates the dark-field converted image Itg corresponding to the G component. Note that the processing unit 14 can obtain the color dark-field converted image It by merging the dark-field converted images Itb, Itr, and Itg.

FIG. 8 illustrates a state in which a bright-field image Ib is acquired by performing the optical measurement method (an algorithm of the optical measurement program stored in the non-transitory storage medium) according to the present embodiment using the same object O, and a dark-field converted image It (left diagram in FIG. 8) generated from the bright-field image Ib by performing the dark-field conversion and a dark-field image Id (right diagram in FIG. 8) actually captured using the dark-field optical system 122 are arranged side by side. The color dark-field converted image It obtained by the dark-field conversion according to the present embodiment as shown in the example illustrated on the left side of FIG. 8, and the dark-field image Id acquired using the dark-field optical system 122 as shown in the example illustrated on the right side of FIG. 8 substantially match. Therefore, it is not necessary to set a special optical system such as the dark-field optical system 122 due to the processing unit 14 according to the present embodiment, and the color dark-field converted image It corresponding to the dark-field image Id is output based on the bright-field optical system 22.

The object O (sample of the image illustrated on the left side of FIG. 8) containing the solvent S and the target T is disposed between the illuminator illustrated in FIG. 1 and the imaging optical system (bright-field optical system) 22. In addition, the object O (sample of the image illustrated on the right side of FIG. 8) is disposed between the illuminator of the dark-field optical system 122 illustrated in FIG. 3 and the lens L1. The object O in the present embodiment is an object in which the target T is mixed in the solvent S. The solvent S is a liquid, for example, water. The solvent S may be a material other than water. The solvent S may be colored. As the solvent S, a solvent through which light emitted from the light source of the illuminator can pass as it is.

Finally, a method for estimating information regarding a physical property by image analysis based on the dark-field converted image It (Itb, Itr, and Itg) acquired using the bright-field optical system 22 according to the present embodiment will be described.

First, the processing unit 14 generates a hue image Ih obtained by converting each pixel value into a hue for the dark-field converted image It generated by the dark-field conversion for each wavelength. Hereinafter, processing of generating the dark-field converted image It and converting the dark-field converted image It into the hue image Ih is referred to as hue generation processing. Note that the dark-field converted image It reflects the wavelength dependence of the diffracted light, and the hue image Ih also reflects the wavelength dependence of the diffracted light. Then, the processing unit 14 can estimate information regarding the physical property of the object O (target T) by performing image analysis on the hue image Ih. Examples of the content of the image analysis performed by the processing unit 14 include calculating the frequency of each hue value appearing in the hue image Ih, that is, a histogram of the hues. FIG. 9 is a schematic diagram of a procedure of a hue generation processing method performed by the processing unit 14 and a method for estimating information regarding a physical property by the processing unit 14. Examples of the information regarding the physical property of the object to be estimated include a density, a volume, a material, a weight, a refractive index, a temperature, and a distortion of the object in addition to the concentration ratio $\rho$ of the target T contained in the object to be measured in the present embodiment.

In the present embodiment, an example will be described in which a bright-field image Ib of a flocculated body (referred to as a floc) produced by injecting a flocculant into a suspended substance in water as the target T of the object O is captured, and information regarding a physical property of the target T of the object O is estimated by performing the optical measurement method according to the present embodiment on the bright-field image Ib. In the present embodiment, objects (samples) O of three types of flocs (targets T) having different concentration ratios $\rho$ were prepared. Here, each of the concentration ratios $\rho$ is defined by the concentration of the suspended substance used to produce the floc (target T) and the concentration of the flocculant as in the following expression (8).

$$\rho = \left(\text{concentration of flocculant}\left[\text{mg/L}\right]\right) \qquad (8)$$

-continued $$/(\text{concentration of the suspended substance } [\text{mg/L}])$$

In addition, the processing unit 14 calculates a hue histogram as analysis of the hue image Ih. Results of the calculation are illustrated in FIG. 10. In FIG. 10, values close to 0.0 on the horizontal axis correspond to red, and values close to 0.6 on the horizontal axis corresponds to blue. The vertical axis in FIG. 10 indicates the number of pixels having the hue value as the frequency. From this result, it can be seen that two mountain-shaped curves appear in the hue histogram, and each of peak values of the curves has a correlation with the concentration ratio ρ. That is, it can be seen that the height of each peak changes according to the concentration ratio ρ. Therefore, the processing unit 14 defines a value of "Γ" as an index for quantitatively evaluating this relationship. First, the processing unit 14 determines two regions in the hue histogram. In the present embodiment, the region 1 and the region 2 are determined using a hue value close to the center between hue values corresponding to the two peaks as a boundary. The frequency decreased as the concentration ratio ρ increased around the peak in the region 1, and conversely, the frequency increased as the concentration ratio ρ increased around the peak in the region 2. The area of the histogram in the region 1 and the area of the histogram in the region 2 are calculated, and the ratio of the areas is defined as "Γ". That is, the area ratio Γ is expressed as expression (9).

$$\Gamma = (\text{area of region 2})/(\text{area of region 1}) \qquad (9)$$

FIG. 11 is a scatter diagram obtained by calculating the area ratio Γ defined as described above with respect to each concentration ratio ρ. As can be seen from FIG. 11, there is a positive correlation between the concentration ratio ρ and the area ratio Γ. That is, the area ratio Γ increases as the concentration ratio ρ increases, and the area ratio Γ decreases as the concentration ratio ρ decreases. That is, in the present embodiment, it can be said that the estimation of the information regarding the physical property such as the concentration ratio ρ of the floc was implemented by the optical measurement method.

Although the area ratio Γ is defined as in the expression (9), other indices for quantitative evaluation are conceivable. For example, it is conceivable to use not an area but a ratio of two points having a maximum value in the histogram or a fitting parameter in a case where the histogram is fitted in a function form.

A series of processes for estimating a physical property distribution of the target T such as the concentration ratio ρ of the floc in a case where the optical measurement apparatus 10 according to the present embodiment is used in the water treatment system will be described with reference to FIG. 2.

First, the processing unit 14 causes the imaging element 24 to capture an image of the object O containing the target T in the solvent S to acquire the bright-field image Ib (step ST1).

Then, the processing unit 14 performs the hue generation processing (step ST4) through steps ST2, ST31, and ST32 illustrated in FIG. 2.

Based on the image of the target T captured and acquired by the imaging element 24, the processing unit 14 converts output values of pixels constituting the dark-field converted image It of the target T into hues. The processing unit 14 further calculates a hue histogram for all or some of pixels of the hue image Ih in order to perform processing on the target hue image Ih.

The processing unit 14 calculates the above-described area ratio Γ from the hue histogram. That is, the processing unit 14 acquires information regarding the object O containing the target T different from the solvent S based on all or some of pixels of the bright-field image Ib captured by the imaging element 24. Then, the processing unit 14 reads the concentration ratio ρ stored in, for example, the storage medium and corresponding to the area ratio Γ, and estimates the concentration ratio ρ (step ST5). It is known that the density of the target T in the object O can be estimated by, for example, multiplying the concentration ratio ρ by an appropriate coefficient.

Then, the processing unit 14 outputs the concentration ratio ρ and/or the density of the target T in the object O (step ST6).

As described above, for example, by estimating the concentration ratio ρ and/or the density of a floc in an estimation target part, the processing unit 14 of the optical measurement apparatus 10 included in the water treatment system or an operator of the water treatment system can estimate a necessary amount of the flocculant in the estimation target part. The concentration ratio ρ varies from hour to hour due to the influence of nature, such as the rise of a river, muddiness in a river, or the water storage level of a dam lake, due to rainfall. Based on the concentration ratio ρ measured and output by using the optical measurement apparatus 10 according to the present embodiment, the processing unit 14 or the operator of the water treatment system can determine the amount of the flocculant regardless of the influence of a fluctuation in water quality.

For example, in a case where the temperature of the object O (target T) changes, the refractive index of the target T changes. Therefore, by comparing intensities of light of two or more different wavelength spectra, the temperature or the refractive index of the target T is estimated, that is, a physical property distribution regarding the target T is estimated.

Similarly, in a case where the temperature of the target T changes, the concentration ratio ρ and the density of the target T may change. Therefore, by comparing intensities of light of two or more different wavelength spectra, a temperature, a concentration ratio, and a density of the target T are estimated, that is, the physical property distribution regarding the target T is estimated.

The above-described information regarding the target T different from the solvent S is, for example, a shape, a density, a concentration ratio, a volume, a material, a weight, a refractive index, and the like of the target T. As described above, according to the optical measurement apparatus 10 according to the present embodiment, it is possible to acquire, in a non-contact manner, the information regarding the physical property of the target T in the solvent S in the object O, which has not been able to be measured or acquired in a non-contact manner and quickly. In addition, by the processing using the processing unit 14, it is possible to generate the hue image Ih based on the bright-field image Ib captured by the imaging element 24, compare intensities of light of two or more different wavelength spectra, and estimate the physical property distribution of the target T different from the solvent S in the object O.

As described above, according to the present embodiment, for example, it is possible to provide the optical measurement apparatus 10, the optical measurement method, and the optical measurement program stored in the non-transitory storage medium, which are configured to estimate information regarding a physical property of an object having an appropriate structure.

The optical measurement method according to the present embodiment includes: illuminating an object O with illuminating light having a first wavelength (B light) and a second wavelength (R light) different from the first wavelength, forming an object image (bright-field image) Ib including at least a part of the object O by the imaging optical system (bright-field optical system 22), and capturing and acquiring the object image Ib by the imaging element 24 configured to distinguish a spectrum including the first wavelength and a spectrum including the second wavelength by each pixel; performing dark-field conversion for the first wavelength based on the object image Ib to obtain a first converted image It1 (Itb); performing dark-field conversion for the second wavelength based on the object image Ib to obtain a second converted image It2 (Itr); performing hue generation processing of generating a hue image Ih from the first converted image It1 and the second converted image It2; and estimating information regarding a physical property of the object O based on the hue image.

The non-transitory storage medium storing the optical measurement program according to the present embodiment causes a computer to execute: illuminating an object O with illuminating light having a first wavelength (B light) and a second wavelength (R light) different from the first wavelength, forming an object image (bright-field image) IB including at least a part of the object O by the imaging optical system (bright-field optical system 122), and capturing and acquiring object image data Ib by the imaging element 24 configured to distinguish a spectrum including the first wavelength and a spectrum including the second wavelength by each pixel; performing dark-field conversion for the first wavelength based on the object image data Ib to obtain first converted image data It1 (Itb); performing dark-field conversion for the second wavelength based on the object image data Ib to obtain second converted image data It2 (Itr); performing hue generation processing of generating hue image data Ih from the first converted image data It1 and the second converted image data It2; and estimating information regarding a physical property of the object O based on the hue image data Ih.

The optical measurement apparatus 10 according to the present embodiment includes the processor of the processing unit 14. The processor illuminates an object O with illuminating light having a first wavelength (for example, B light) and a second wavelength (for example, R light) different from the first wavelength, forms an object image including at least a part of the object O by the imaging optical system 22, captures and acquires object image data Ib by the imaging element 24 configured to distinguish a spectrum including the first wavelength and a spectrum including the second wavelength by each pixel, performs dark-field conversion for the first wavelength based on the object image data Ib to obtain first converted image data It1 (Itb), performs dark-field conversion for the second wavelength based on the object image data Ib to obtain second converted image data It2 (Itr), performs hue generation processing of generating hue image data Ih based on the first converted image data It1 and the second converted image data It2, and estimates information regarding a physical property of the object O based on the hue image data Ih.

Therefore, the processor performs dark-field conversion (processing of extracting diffracted light) based on the object image (=bright-field image) Ib, calculates the hue image data Ih using information of the wavelengths, and can acquire the information regarding the physical property of the object O based on the hue image data Ih.

Performing the dark-field conversion includes performing processing of extracting a part of a spatial frequency domain based on the object image data Ib.

Therefore, the processor can acquire an intensity distribution of diffracted light for each wavelength with respect to the bright-field object image data Ib.

Performing the dark-field conversion includes performing processing of setting an electric field at a position corresponding to a non-diffracted light component to zero on the third plane $\Sigma_2$ in a case where the first plane $\Sigma_1$ perpendicular to the optical axis OA of the bright-field optical system 22 immediately after transmission of the light through the object O, the second plane $\Sigma_3$ as the imaging plane of the imaging element 24, and the virtual third plane $\Sigma_2$ perpendicular to the optical axis OA between the first plane $\Sigma_1$ and the second plane $\Sigma_3$ are defined.

In a case where the dark-field conversion is performed on the third plane $\Sigma_2$ with respect to the bright-field image Ib of the first plane $\Sigma_1$, the mask processing is performed to block the non-diffracted light, and the dark-field converted image It from which the diffracted light was extracted can be acquired on the imaging plane (second plane $\Sigma_3$).

Performing the hue generation processing includes generating the color image data It in which the first converted image data It1 and the second converted image data It2 are set as the color channels, and includes converting each pixel value of the color image data It into a hue and setting the converted hues as the hue image data Ih. Therefore, the processing unit 14 can acquire the color dark-field converted image It reflecting the wavelength dependence of the diffracted light. In addition, the processing unit 14 can handle, for example, information of the three wavelengths (colors) as one scalar quantity, which facilitates quantitative evaluation.

Estimating the information regarding the physical property of the object O based on the hue image data Ih includes calculating a hue histogram for all or some of pixels of the hue image data Ih. Therefore, the processor can measure information regarding the physical property of the object O based on the hue histogram.

The object image data Ib includes the straight light when the parallel light is transmitted through the object O. Therefore, the dark-field converted image It can be theoretically calculated by modeling the dark-field optical system 122 illustrated in FIG. 3.

The information regarding the physical property is information regarding at least one of a density, a concentration ratio, a volume, a material, a weight, a refractive index, a temperature, and a distortion regarding the object O. A specific physical quantity responsible for the physical property of the object O can be measured by an optical physical property measurement method.

The optical measurement apparatus 10, the optical measurement method, and the non-transitory storage medium storing the optical measurement program according to the present embodiment can be used in various fields such as the medical field and the marine field.

The optical measurement apparatus 10 according to the present embodiment can be used, for example, in the medical field in a case where information regarding tissue in a cell membrane is acquired. The optical measurement apparatus 10 according to the present embodiment can acquire, for example, a structure of a transparent cell as an image. Examples of the information regarding the target T different from the solvent S include cytoplasm, a nucleus, and a mitochondrion. Then, based on the image (bright-field image) Ib including the information regarding the target T acquired using the processing unit 14, it is possible to estimate information regarding at least one of shapes, densities or concentration ratios, volumes, materials, weights, refractive indices, temperatures, distortions, and the like of tissue, a nucleus, and the like in a cell.

In addition, in the marine field, the optical measurement apparatus 10 according to the present embodiment can be installed on an ocean to acquire the shape of the target T such as microplastic as the image (bright-field image) Ib, and can estimate at least one of the shape, the density or the concentration ratio, the volume, the material, the weight, and the like of the target T based on the acquired image (bright-field image) Ib including information regarding the target T. The optical measurement apparatus 10 according to the present embodiment can visualize, for example, the degree of contamination in real time in a specific region in an ocean.

In addition, it is possible to capture and analyze, as the image (bright-field image) Ib of the target T, a scattered object from a target material at the time of performing, for example, laser peening for improving the target material by emitting laser light into water, or capture and analyze, as the image (bright-field image) Ib, the occurrence of cavitation at the time of performing laser peening. Therefore, the optical measurement apparatus 10 according to the present embodiment can capture a phenomenon, a mechanism, and the like caused by laser peening.

In the above-described embodiment, an example in which water is used as the solvent S has been described, but an appropriate solvent different from simple water can also be used.

According to the optical measurement apparatus 10, the optical measurement method, and the non-transitory storage medium storing the optical measurement program of at least one embodiment described above, for example, information regarding a physical property of an object having an appropriate structure can be estimated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical measurement method comprising:
illuminating an object with illuminating light having a first wavelength and a second wavelength different from the first wavelength, forming an object image including at least a part of the object by a bright-field optical system, and capturing and acquiring object image data by an imaging element configured to distinguish a spectrum including the first wavelength and a spectrum including the second wavelength by each pixel;
performing dark-field conversion for the first wavelength based on the object image data to obtain first converted image data;
performing dark-field conversion for the second wavelength based on the object image data to obtain second converted image data;

performing hue generation processing of generating hue image data based on the first converted image data and the second converted image data; and
estimating information regarding a physical property of the object based on the hue image data.

2. The optical measurement method according to claim 1, wherein the performing the dark-field conversion includes performing processing of extracting a part of a spatial frequency domain based on the object image data.

3. The optical measurement method according to claim 1, wherein, in a case where a first plane perpendicular to an optical axis of the bright-field optical system immediately after transmission of the light through the object, a second plane as an imaging plane of the imaging element, and a virtual third plane perpendicular to the optical axis between the first plane and the second plane are defined, the performing the dark-field conversion includes performing processing of setting an electric field at a position corresponding to a non-diffracted light component to zero on the third plane.

4. The optical measurement method according to claim 1, wherein
the performing the hue generation processing includes:
generating color image data having the first converted image data and the second converted image data as respective color channels; and
converting each pixel value of the color image data into a hue, and setting the hue as the hue image data.

5. The optical measurement method according to claim 1, wherein the estimating the information regarding the physical property of the object based on the hue image data includes calculating a hue histogram for all or some of pixels of the hue image data.

6. The optical measurement method according to claim 1, wherein the object image data includes straight light when parallel light is transmitted through the object.

7. The optical measurement method according to claim 1, wherein the information regarding the physical property is information regarding at least one of a density, a concentration ratio, a volume, a material, a weight, a refractive index, a temperature, and a distortion regarding the object.

8. The optical measurement method according to claim 1, wherein the object contains a solvent and a target in the solvent, the target being a substance different from the solvent.

9. An optical measurement apparatus comprising a processor configured to:
illuminate an object with illuminating light having a first wavelength and a second wavelength different from the first wavelength, form an object image including at least a part of the object by a bright-field optical system, and capture and acquire object image data by an imaging element configured to distinguish a spectrum including the first wavelength and a spectrum including the second wavelength by each pixel;
perform dark-field conversion for the first wavelength based on the object image data to obtain first converted image data;
perform dark-field conversion for the second wavelength based on the object image data to obtain second converted image data;
perform hue generation processing of generating hue image data based on the first converted image data and the second converted image data; and
estimate information regarding a physical property of the object based on the hue image data.

10. The optical measurement apparatus according to claim 9, wherein the processor performs processing of extracting a part of a spatial frequency domain based on the object image data in order to perform the dark-field conversion.

11. The optical measurement apparatus according to claim 9, wherein, in a case where a first plane perpendicular to an optical axis of the bright-field optical system immediately after transmission of the light through the object, a second plane as an imaging plane of the imaging element, and a virtual third plane perpendicular to the optical axis between the first plane and the second plane are defined, the processor performs processing of setting an electric field at a position corresponding to a non-diffracted light component to zero on the third plane in order to perform the dark-field conversion.

12. The optical measurement apparatus according to claim 9, wherein the processor performs processing of generating color image data having the first converted image data and the second converted image data as respective color channels, and processing of converting each pixel value of the color image data into a hue and setting the hue as the hue image data in order to perform the hue generation processing.

13. The optical measurement apparatus according to claim 9, wherein the processor performs processing of calculating a hue histogram for all or some of pixels of the hue image data in order to estimate information regarding the physical property of the object based on the hue image data.

14. The optical measurement apparatus according to claim 9, wherein the processor outputs, as the information regarding the physical property, information regarding at least one of a density, a concentration ratio, a volume, a material, a weight, a refractive index, a temperature, and a distortion regarding the object.

15. The optical measurement apparatus according to claim 9, further comprising:

the bright-field optical system; and the imaging element.

16. A non-transitory storage medium storing an optical measurement program, the optical measurement program causing a computer to execute:

illuminating an object with illuminating light having a first wavelength and a second wavelength different from the first wavelength, forming an object image including at least a part of the object by the bright-field optical system, and capturing and acquiring object image data by an imaging element configured to distinguish a spectrum including the first wavelength and a spectrum including the second wavelength by each pixel;

performing dark-field conversion for the first wavelength based on the object image data to obtain first converted image data;

performing dark-field conversion for the second wavelength based on the object image data to obtain second converted image data;

performing hue generation processing of generating hue image data based on the first converted image data and the second converted image data; and estimating information regarding a physical property of the object based on the hue image data.

* * * * *